(12) United States Patent
Norota

(10) Patent No.: US 9,036,178 B2
(45) Date of Patent: May 19, 2015

(54) DISPLAY APPARATUS, METHOD OF CONTROLLING OPERATIONS OF THE SAME, AND NETWORK SYSTEM

(71) Applicant: Ken Norota, Kanagawa (JP)

(72) Inventor: Ken Norota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/956,440

(22) Filed: Aug. 1, 2013

(65) Prior Publication Data

US 2014/0036299 A1    Feb. 6, 2014

(30) Foreign Application Priority Data

Aug. 2, 2012    (JP) ................................ 2012-172309

(51) Int. Cl.
  *G06K 15/00*  (2006.01)
  *G06F 3/12*  (2006.01)
  *G06F 11/07*  (2006.01)
  *G06F 11/32*  (2006.01)

(52) U.S. Cl.
  CPC ............ *G06F 3/121* (2013.01); *G06F 11/0733* (2013.01); *G06F 11/0793* (2013.01); *G06F 11/321* (2013.01)

(58) Field of Classification Search
  CPC ........................... H04L 12/585; G06G 10/107

USPC ....................................................... 358/1.14
See application file for complete search history.

(56) References Cited

U.S. PATENT DOCUMENTS

| 8,427,662 | B2 | 4/2013 | Asakimori et al. |
| 2012/0324031 | A1* | 12/2012 | Asthana et al. ............... 709/206 |
| 2014/0009783 | A1* | 1/2014 | Chakirov, Martin ......... 358/1.15 |
| 2014/0063537 | A1* | 3/2014 | Nishikawa et al. .......... 358/1.15 |

FOREIGN PATENT DOCUMENTS

| JP | 2004-255674 | 9/2004 |
| JP | 2010-107571 | 5/2010 |

* cited by examiner

*Primary Examiner* — Jerome Grant, II
(74) *Attorney, Agent, or Firm* — Harness, Dickey & Pierce, P.L.C.

(57) ABSTRACT

A display apparatus includes a display device, obtains first information indicating an error occurring in an electronic apparatus from the electronic apparatus; transmits, to an external information processing apparatus, the obtained first information and second information indicating a display capability of the display device, and obtains third information indicating a manner of dealing with the error occurring in the electronic apparatus. The third information has been transmitted by the external information processing apparatus based on the first information and the second information. The display control part then displays the obtained third information on the display device.

8 Claims, 17 Drawing Sheets

| QR CODE INFORMATION |
| --- |
| IP ADDRESS OF SERVER |
| ERROR CODE |
| APPARATUS TYPE CODE |
| ... |

| ERROR CODE | APPARATUS TYPE CODE |
| --- | --- |
| JAM001 | AXYZ-001 |
| JAM002 | AXYZ-002b |
| SC500 | BKLM-001 |
| SC991 | BKLM-001b |
| ... | ... |

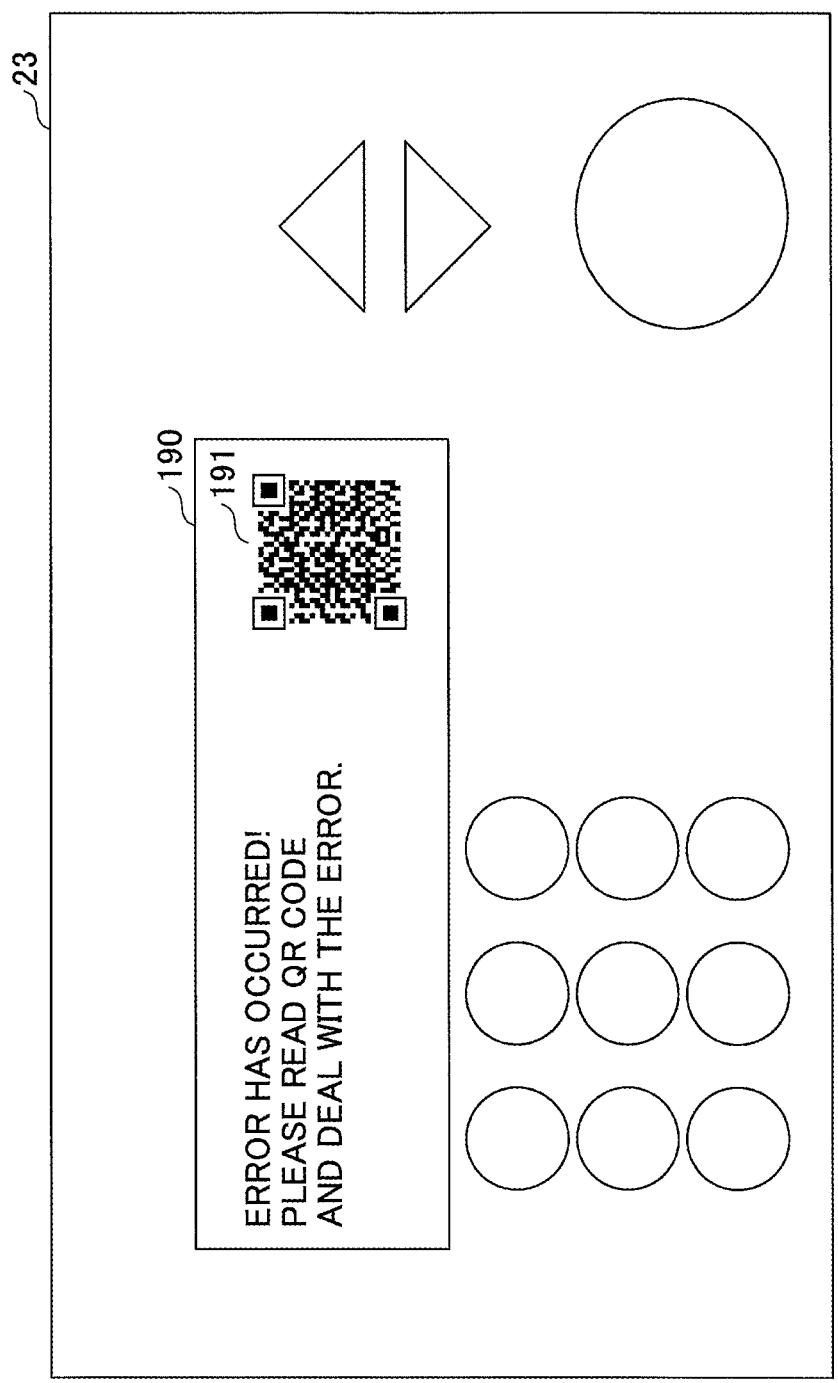

FIG.13A

METHOD OF REMOVING ERROR:

1. PLEASE OPEN THE DOOR X OF THE IMAGE FORMING APPARATUS.
2. PLEASE ...
3. PLEASE ...
4. PLEASE ...

FIG.13B

METHOD OF REMOVING ERROR:

1. PLEASE OPEN THE DOOR X OF THE IMAGE FORMING APPARATUS.
2. PLEASE ...

DISPLAY APPARATUS, METHOD OF CONTROLLING OPERATIONS OF THE SAME, AND NETWORK SYSTEM

BACKGROUND OF THE INVENTION

1. Field of the Invention

The present invention relates to a display apparatus, a method of controlling operations of the same, and a network system.

2. Description of the Related Art

For example, a method is known for displaying a QR code (registered trademark) on a screen of an apparatus when a problem has occurred in the apparatus, the QR code is then read using a smart device, and information concerning the problem is obtained from the read QR code (see Japanese Laid-Open Patent Application No. 2010-107571).

However, in this method, although information concerning a problem, for example, information for dealing with a problem that has occurred in an apparatus to be utilized has been thus obtained in a smart device, it may be impossible to display the obtained information on a screen of the smart device in a manner suitable for the display capability of the smart device. That is, a display capability such as a screen size, a resolution of a screen and so forth depends on each smart device. Therefore, only by displaying the obtained information on the screen of the smart device as it is, the displayed information may be such that, the information cannot be easily read, a drawing or the like included in the information cannot be displayed, or the like, depending on the display capability of the smart device.

SUMMARY OF THE INVENTION

According to one embodiment of the present invention, a display apparatus includes a display device; a first obtaining part that obtains, from an electronic apparatus, first information indicating an error occurring in the electronic apparatus; a second obtaining part that transmits, to an external information processing apparatus, the first information obtained by the first obtaining part and second information indicating a display capability of the display device, and obtains third information indicating a manner of dealing with the error occurring in the electronic apparatus which has been transmitted by the external information processing apparatus based on the first information and the second information; and a display control part that displays, on the display device, the third information obtained by the second obtaining part.

Other objects, features and advantages of the present invention will become more apparent from the following detailed description when read in conjunction with the accompanying drawings.

BRIEF DESCRIPTION OF THE DRAWINGS

FIG. 12 shows one example of a QR code displayed on a screen of an operation part;

FIGS. 13A, 13B and 13C show examples of displaying the guidance information on screens of smart devices.

DETAILED DESCRIPTION OF THE EMBODIMENT

Below, the first embodiment of the present invention will be described.

<General Configuration of Network System>

Figure 1:
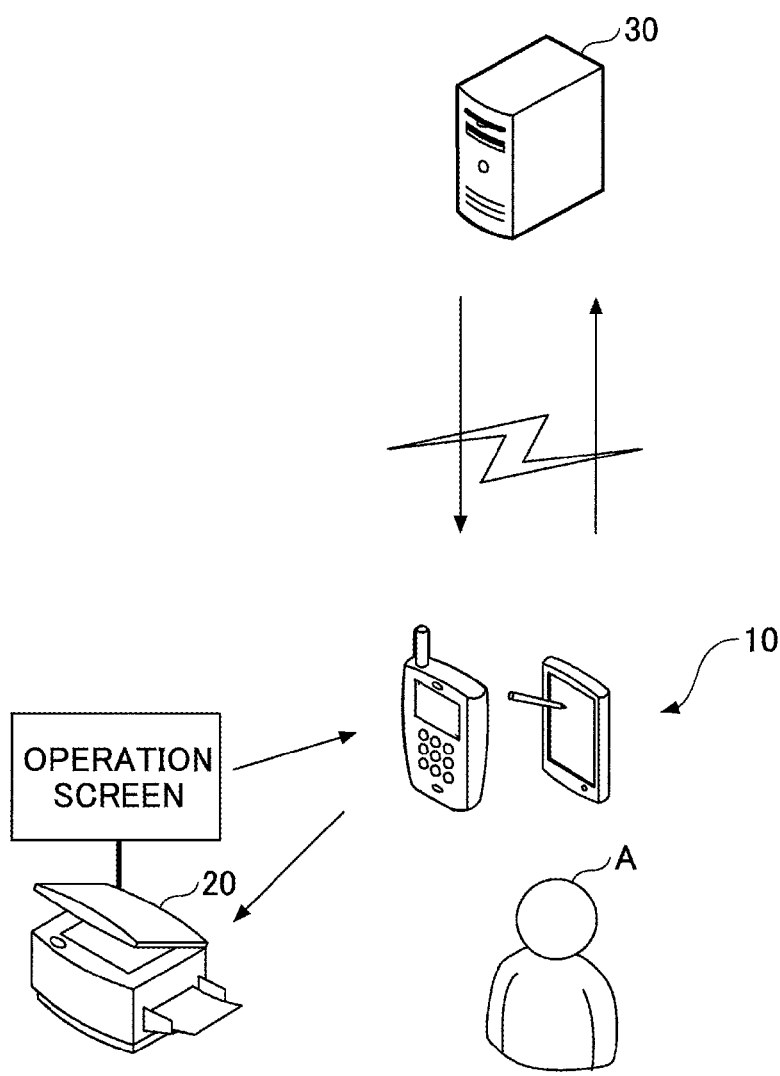
FIG. 1 shows one example of a general configuration of a network system according to a first embodiment.

FIG. 1 shows one example of a network system according to the first embodiment. As shown in FIG. 1, the network system 100 according to the first embodiment is configured to include a smart device 10 as one example of a display apparatus; an image forming apparatus 20 as one example of an electronic apparatus; and a server 30 as one example of an (external) information processing apparatus. In the network system 100, the smart device 10 transmits and receives various sorts of information to and from the image forming apparatus 20 and the server 30 using, for example, wireless communication or the like.

The smart device 10 is a multifunctional terminal such as, for example, a smartphone, a tablet terminal, or the like, and is a device that a user A has. The user A uses the smart device 10 and, for example, sends a print request or the like to the image forming apparatus 20.

The image forming apparatus 20 is, for example, a Multi-Function Peripheral (MFP) or the like that can be used as a printer, a facsimile machine, a scanner and a copier. The image forming apparatus 20 may have a cooperation function(s) with another image forming apparatus(es) such that, for example, the image forming apparatus 20 shares a given job with another image forming apparatus(es), causes another image forming apparatus(es) to carry out a job from a point to which the image forming apparatus 20 has carried out until now, or the like.

When the image forming apparatus 20 has carried out printing in response to a print request sent from the smart device 10 and, for example, an error (problem) such as a paper jam has occurred, the image forming apparatus 20 displays information indicating the error on an operation screen such as an operation panel in a form of predetermined code information (for example, a two-dimensional code such as a QR code, a barcode, or the like) which includes the information indicating the error.

The predetermined code information includes, in addition to an error code that indicates the contents of the error that has occurred in the image forming apparatus 20, inquiry destination information (for example, predetermined address information) for reaching the server 30 that stores guidance information indicating how to deal with the error, and so forth.

Below, a description will be made using, for example, QR code information as one example of the predetermined code information.

The server 30 stores, for example, an error removal procedure or the like, as the guidance information corresponding to the error code. It is preferable that the server 30 previously stores the guidance information corresponding to the display capability of the smart device 10. It is to be noted that in a case where the server 30 does not store the guidance information corresponding to the display capability of the smart device 10, the server 30 may be configured so that the server 30 converts the guidance information into one that corresponds to the display capability of the smart device 10.

When an error has occurred during use of the image forming apparatus 20 and thus a QR code has been displayed on the operation screen of the image forming apparatus 20, the smart device 10 is used to read the displayed QR code and then, requests the guidance information from the server 30 by use of information included in the read QR code.

Specifically, in order to request the guidance information from the server 30, the smart device 10 transmits information indicating the display capability of the smart device 10, together with the error code and so forth included in the read QR code. The information indicating the display capability includes screen information such as the size, the resolution and/or the like of a screen page that the smart device 10 is capable of displaying, linguistic information, a moving image reproducing function, performance information of the Operating System (OS) (in particular, information concerning the display capability), and/or the like. However, the information indicating the display capability is not limited thereto.

After obtaining the information indicating the display capability together with the error code and so forth from the smart device 10, the server 30 transmits, to the smart device 10, the guidance information corresponding to the error code of the image forming apparatus 20 and the display capability of the smart device 10.

Therefore, the smart device 10 can display the guidance information on the screen appropriately as a result of the guidance information thus corresponding to the display capability of the smart device 10.

<Functional Configuration of Smart Device>

Figure 2:
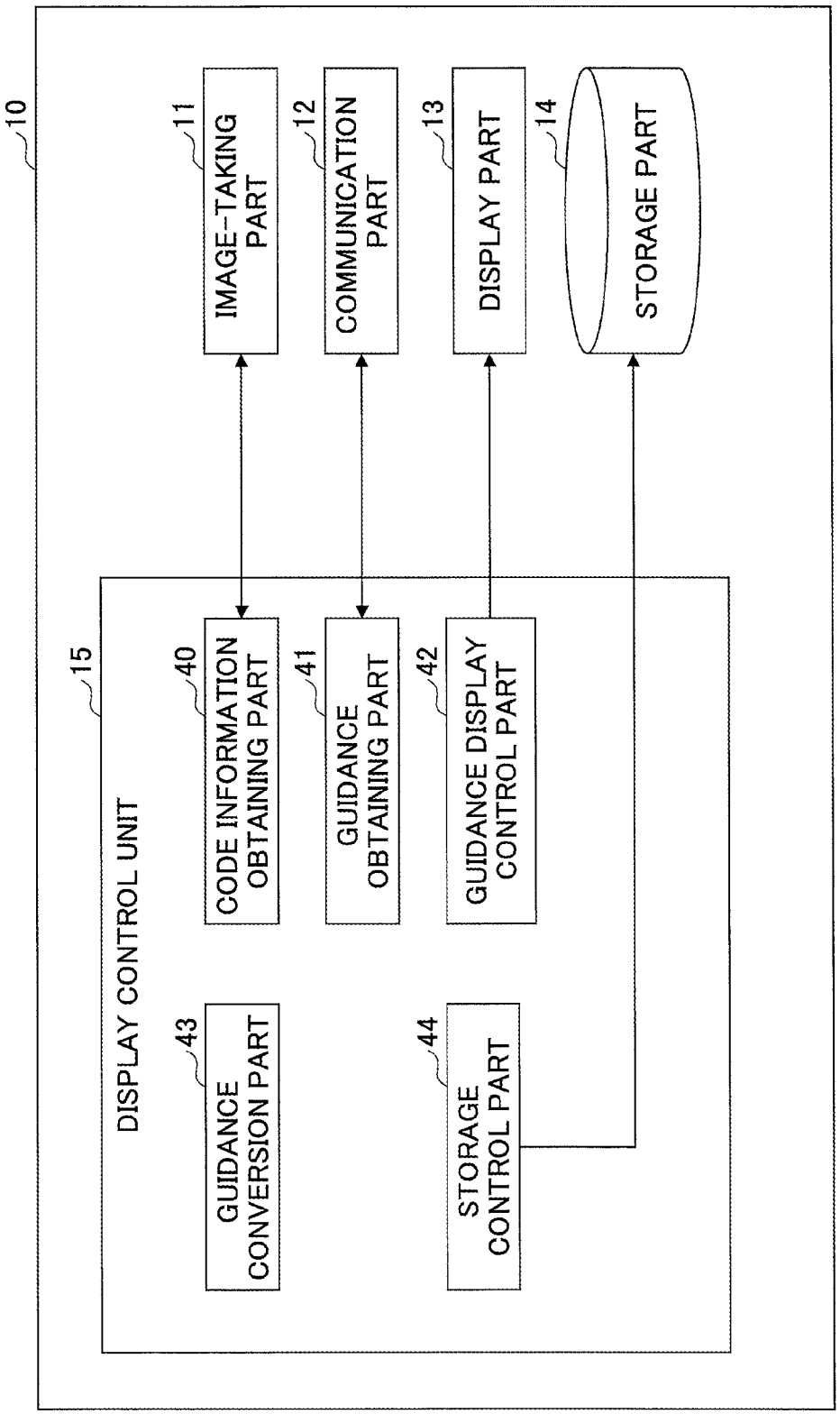
FIG. 2 shows one example of a functional configuration of a smart device according to the first embodiment.

FIG. 2 shows one example of a functional configuration of the smart device 10 according to the first embodiment. As shown in FIG. 2, the smart device 10 is configured to include an image-taking part 11, a communication part 12, a display part 13, a storage part 14 and a display control unit 15.

The image-taking part 11 is, for example, a camera or the like. Further, the image-taking part 11 includes a reading part (such as a scanner, a code reader or the like) to read the predetermined code information such as a QR code, an image of which has been taken.

The communication part 12 connects the smart device 10 with the image forming apparatus 20 and the server 30 via, for example, a communication network typified by the Internet, or the like, and transmits data to and receives data from the image forming apparatus 20 and the server 30.

The display part 13 includes a screen such as a display or the like, and displays information that is controlled by the display control unit 15. Specifically, the display part 13 displays the guidance information obtained from the server 30. A specific example of a manner of displaying the guidance information by the display part 13 will be described later.

The storage part 14 stores, for example, screen information such as the size of a screen page that the smart device 10 is capable of displaying, the resolution information of the same, and/or the like, linguistic information, a moving image reproducing function, performance information such as OS information, and/or the like (in particular, information concerning the display capability). Further, it is also possible to store the guidance information obtained from the server 30 in the storage part 14. It is to be noted that information to be stored in the storage part 14 is not limited thereto.

The display control unit 15 is configured to include a code information obtaining part 40, a guidance obtaining part 41, a guidance display control part 42, a guidance conversion part 43 and a storage control part 44. It is to be noted that it is possible to provide the display control unit 15 in a form of an application (program). In this case, for example, the above-described processes of the display control unit 15 can be carried out as a result of the application program being installed in the smart device 10.

The code information obtaining part 40 obtains, via the image-taking part 11, the predetermined code information such as a QR code, a barcode or the like, and obtains, from the predetermined code information, the error code indicating the contents of the error that has occurred in the image forming apparatus 20 and the address information (IP address or the like) of the server 30 that stores the guidance information.

Thus, the code information obtaining part 40 functions as an information obtaining part that obtains the error code or the like (information indicating an error occurring in an electronic apparatus) indicating the error contents and inquiry destination information from an electronic apparatus such as the image forming apparatus 20, for example.

The guidance obtaining part 41 transmits the error code and the information indicating the display capability (the above-mentioned screen information, performance information and so forth) that is stored in the storage part 14 to the server 30 based on the address information thereof (inquiry destination information) obtained by the code information obtaining part 40.

The guidance obtaining part 41 then obtains, from the server 30, the guidance information corresponding to the error code and the information indicating the display capability of the display part 13 transmitted to the server 30, or the guidance information converted based on the information indicating the display capability. The guidance information corresponds to, for example, information indicating a manner of dealing with the error occurring in an electronic apparatus such as the image forming apparatus 20.

It is to be noted that the guidance obtaining part 41 inquires of the storage control part 44 whether the guidance information corresponding to the error code is stored in the storage part 14, before requesting the guidance information from the server 30. Then, in a case where the corresponding guidance information is stored in the storage part 14, the guidance obtaining part 41 obtains the guidance information from the storage part 14. Further, it is preferable that the guidance obtaining part 41 causes the guidance conversion part 43 to convert the guidance information according to a change of the display capability in a case where the display capability includes the change that has been made after obtaining the guidance information from the server 30.

The guidance display control part 42 controls the display part 13 (display device 72 (described later)) to display the guidance information obtained by the guidance obtaining part 41 on the display part 13 (display device 72).

The guidance conversion part 43 responds to a request from the guidance obtaining part 41, if any, to convert the guidance information according to the change of the display capability of the display part 13. That is, the guidance conversion part 43 has the same function as the function of a guidance conversion part 61 of the server 30 (described later).

The storage control part 44 carries out control to store the guidance information obtained by the guidance obtaining part 41 in the storage part 14. Further, the storage control part 44 responds to an inquiry of the guidance obtaining part 41 to determine whether the storage part 14 has the guidance information corresponding to the error code.

Thereby, the smart device 10 can display the guidance information that corresponds to the display capability of the display part 13 on the screen.

<Functional Configuration of Image Forming Apparatus>

Figure 3:
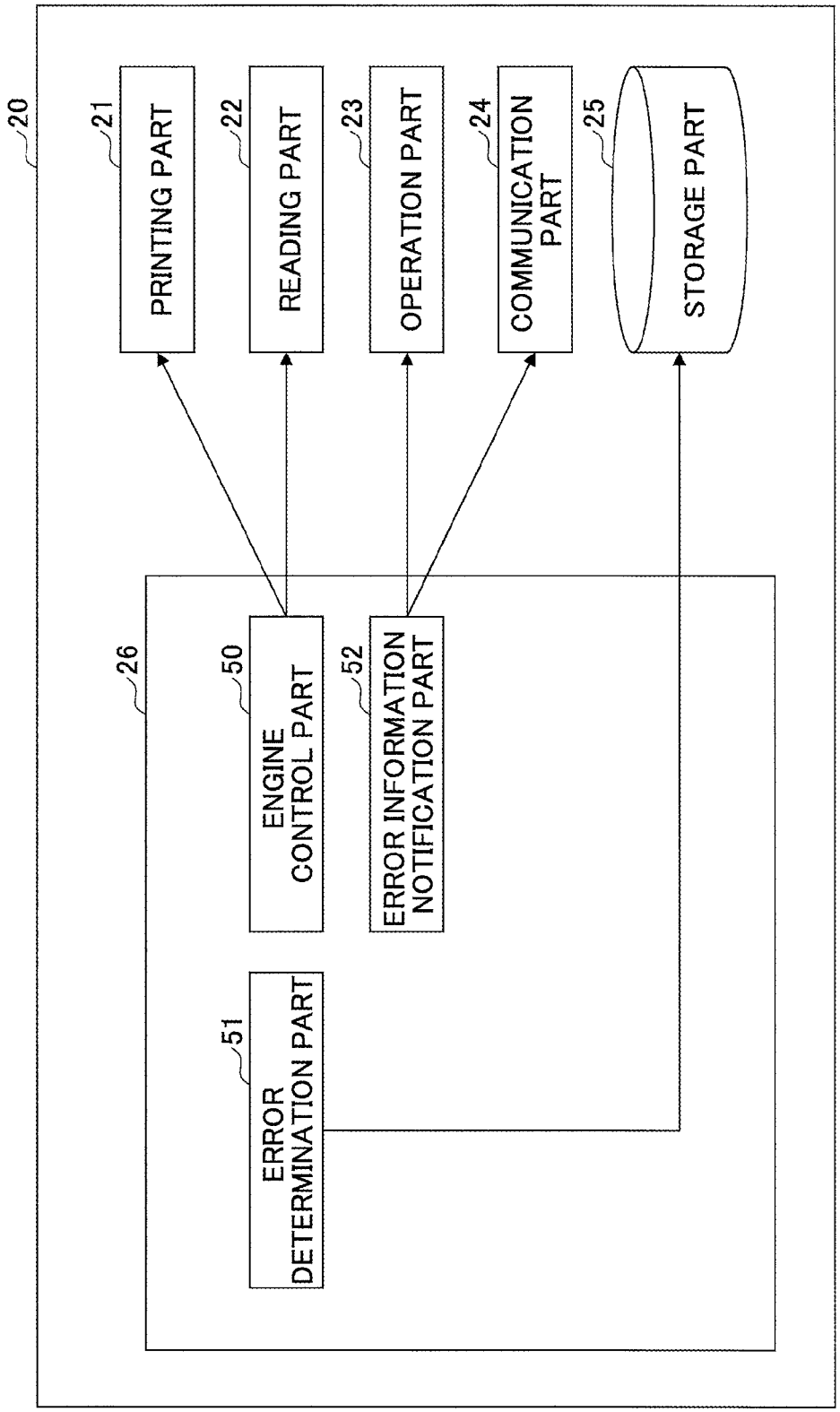
FIG. 3 shows one example of a functional configuration of an image forming apparatus according to the first embodiment.

FIG. 3 shows one example of a functional configuration of the image forming apparatus 20 according to the first embodiment. As shown in FIG. 3, the image forming apparatus 20 is configured to include a printing part 21, a reading part 22, an operation part 23, a communication part 24, a storage part 25 and a control part 26.

The printing part 21 includes, for example, a printer 82 (see FIG. 6), drives a printing unit, conveys a printing medium and prints predetermined data onto the printing medium.

The reading part 22 includes, for example, a scanner 81 (see FIG. 6), and reads an image from a printing medium.

The operation part 23 includes, for example, an operation screen. A user can use the operation part 23 to input instructional contents for operating the image forming apparatus 20. Further, the operation part 23 displays the predetermined code information corresponding to the error contents notified by an error information notification part 52 (described later). It is to be noted that the operation part 23 may include a touch panel or the like, or may have operation buttons or the like.

The communication part 24 includes, for example, a network interface, connects the image forming apparatus 20 with the smart device 10 via, for example, a communication network typified by the Internet, and transmits data to and receives data from the smart device 10. It is to be noted that it is also possible to configure the communication part 24 so that the communication part 24 transmits, to the smart device 10 or the like, the predetermined code information corresponding to the error contents notified by the error information notification part 52.

The storage part 25 stores therein information for enabling the image forming apparatus 20 to carry out an image forming process and so forth. Further, the storage part 25 stores an error determination result of a determination made by an error determination part 51 (described later). It is to be noted that information stored by the storage part 25 is not limited thereto.

The control part 26 includes an engine control part 50, the error determination part 51 and the error information notification part 52.

The engine control part 50 controls the printing part 21 and the reading part 22, and detects an error, if any, occurring in the printing part 21 or the reading part 22.

The error determination part 51 determines the contents of an error occurring in the printing part 21 or the reading part 22 when the error has been notified by the engine control part 50. Based on the determined error contents, the error determination part 51 notifies the error information notification part 52 of error information (information concerning the device at which the error has occurred, the error code indicating the contents of the error, and/or the like) and stores the error information in the storage part 25.

The error information notification part 52 converts the error information obtained from the error determination part 51 into the predetermined code information such as a QR code or the like, and notifies the operation part 23 or the communication part 24 of the converted code information.

Thus, the image forming apparatus 20 is capable of notifying the smart device 10 of the error information and so forth.

<Functional Configuration of Server>

Figure 4:
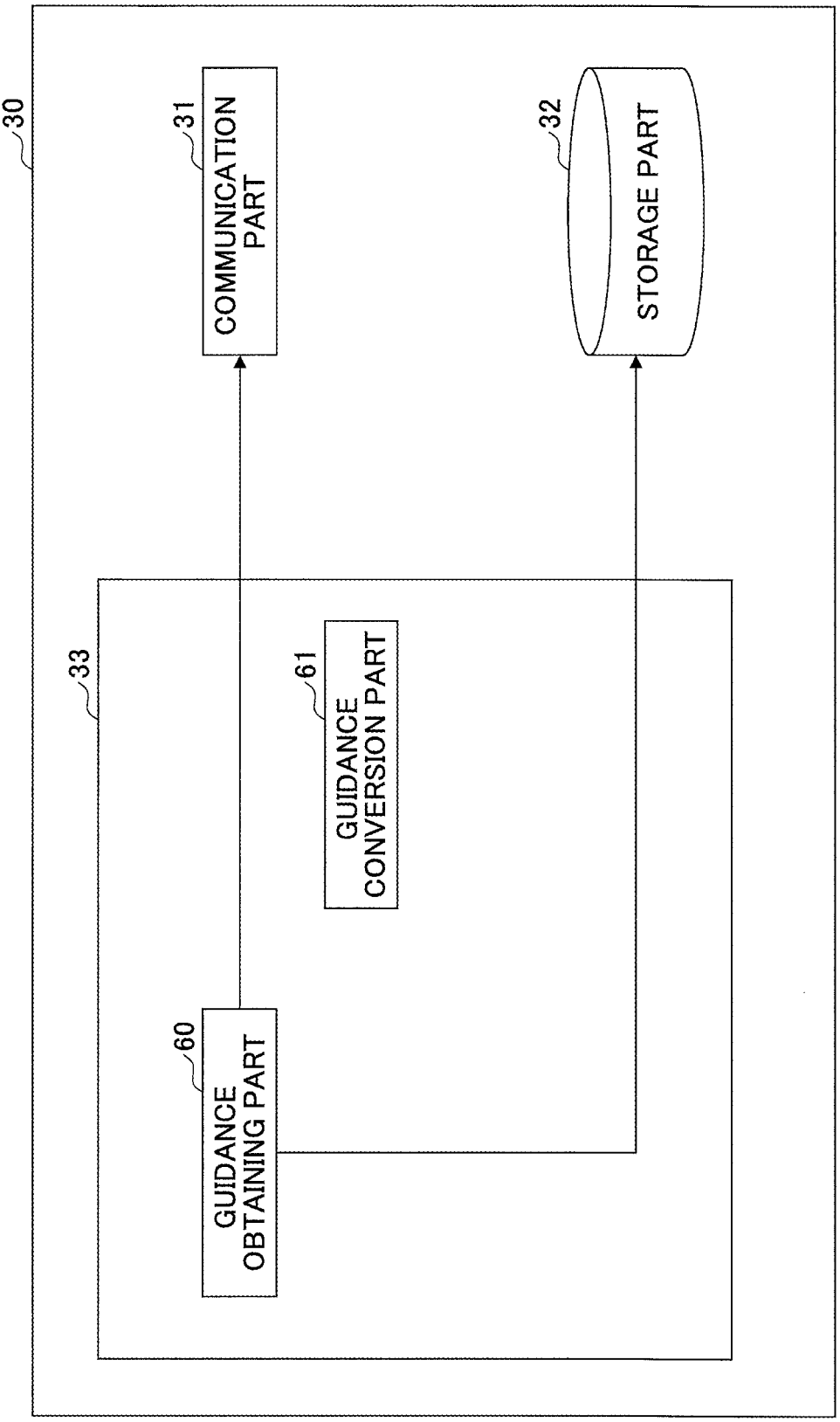
FIG. 4 shows one example of a functional configuration of a server according to the first embodiment.

FIG. 4 shows one example of a functional configuration of the server 30 according to the first embodiment. As shown in FIG. 4, the server 30 includes a communication part 31, a storage part 32 and a guidance providing part 33.

The communication part 31 connects the server 30 with the smart device 10 via, for example, a communication network typified by the Internet, and transmits data to and receives data from the smart device 10.

The storage part 32 stores information for enabling the server 30 to carry out various processes. Further, the storage part 32 previously stores therein the guidance information and so forth provided by the guidance providing part 33. The storage part 32 previously stores, for example, the error contents (the error code) of the image forming apparatus 20 and the guidance information corresponding to the apparatus type of the image forming apparatus 20.

Further, the storage part 32 previously stores the guidance information corresponding to the display capability (the size, the resolution and/or the like of a screen page, linguistic information, a moving image reproducing function, performance of the OS and/or the like, and so forth) of the display part 13 of the smart device 10 or the like. It is to be noted that information stored by the storage part 32 is not limited thereto.

The guidance providing part 33 is configured to include a guidance obtaining part 60 and the guidance conversion part 61. The guidance providing part 33 provides the guidance information according to a request (the error code, the display capability of the smart device 10 and/or the like) sent from the smart device 10.

After obtaining the above-described request sent from the smart device 10 from the communication part 31, the guidance obtaining part 60 reads the guidance information corresponding to the obtained request from the storage part 32, and transmits the read guidance information to the smart device 10 via the communication part (guidance transmission part) 31.

The guidance conversion part 61 converts the guidance information stored in the storage part 32 into guidance information corresponding to the display capability of the display part 13 of the smart device 10.

<Hardware Configuration of Smart Device>

Figure 5:
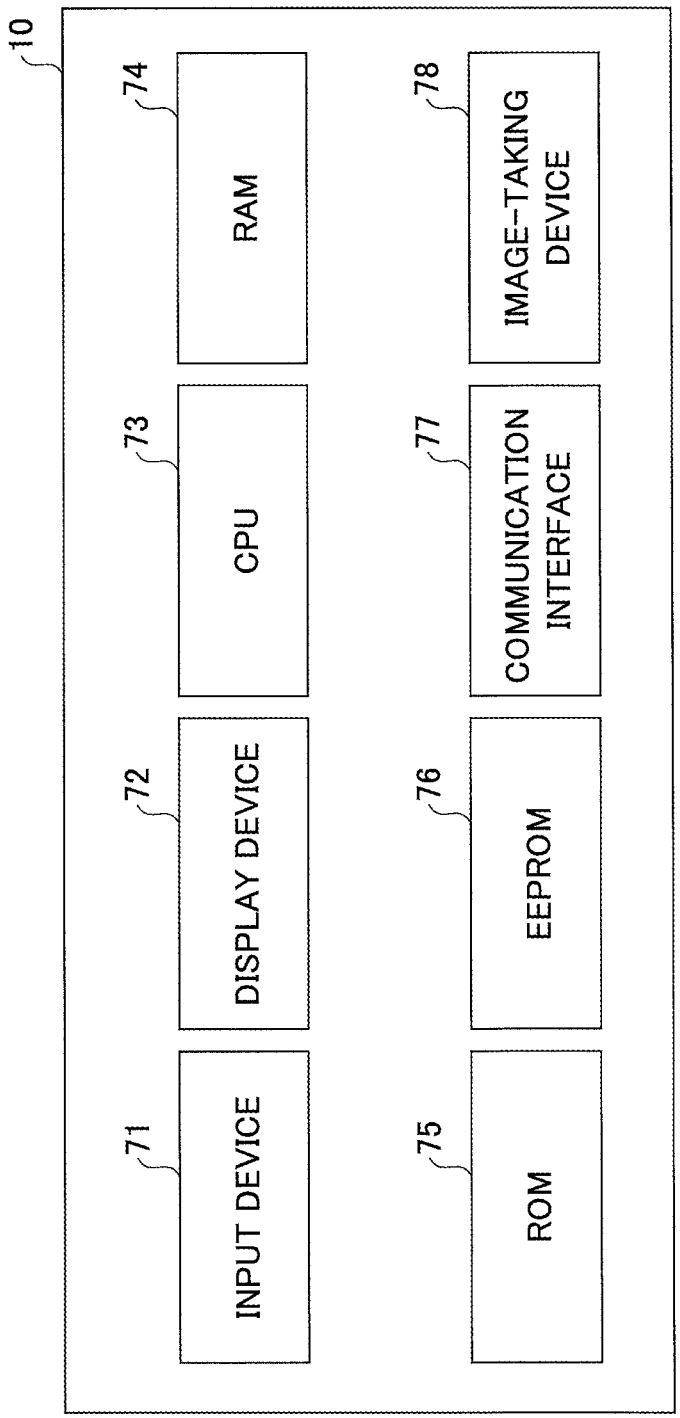
FIG. 5 shows one example of a hardware configuration of the smart device according to the first embodiment.

FIG. 5 shows one example of a hardware configuration of the smart device 10 according to the first embodiment. As shown in FIG. 5, the smart device 10 is configured to include an input device 71, a display device 72, a Central Processing Unit (CPU) 73, a Random Access Memory (RAM) 74, a Read-Only Memory (ROM) 75, an Electrically Erasable Programmable Read-Only Memory (EEPROM) 76, a communication interface 77 and an image-taking device 78.

The input device 71 includes, for example, a touch panel or the like, and is used to input respective operation signals.

The display device 72 includes a display or the like, performs the function of the display part 13, and displays respective processing results.

The CPU 73 reads a program(s) and data prepared for realizing the above-described respective parts and so forth from a storage device (for example, the ROM 75, the EEPROM 76 or the like) to the RAM 74, performs respective processes, carries out control of the entirety of the smart device 10, and/or executes functions that the smart device 10 has.

The RAM 74 is a volatile semiconductor memory (storage device) for temporarily storing therein a program(s) and data for realizing the respective parts and so forth.

The ROM 75 is a nonvolatile semiconductor memory (storage device) that can hold internal data even after the power is turned off. The ROM 75 stores therein a program(s) and data such as a Basic Input/Output System (BIOS) to be executed at a time of starting up, system settings, network settings, and/or the like.

The EEPROM 76 is a nonvolatile memory (storage device), in which it is possible to read data or write data according to control of the CPU 73. For example, the information indicating the display capability of the smart device 10 (the screen information and the performance information), the guidance information obtained from the server 30, and/or the like, is stored therein.

The communication interface 77 is an interface for connecting to a wired or wireless network or the like. Thereby, the smart device 10 is capable of carrying out data communication with another apparatus(es).

The image-taking device 78 is, for example, a camera or the like, and obtains image data that has been taken.

<Hardware Configuration of Image Forming Apparatus>

Figure 6:
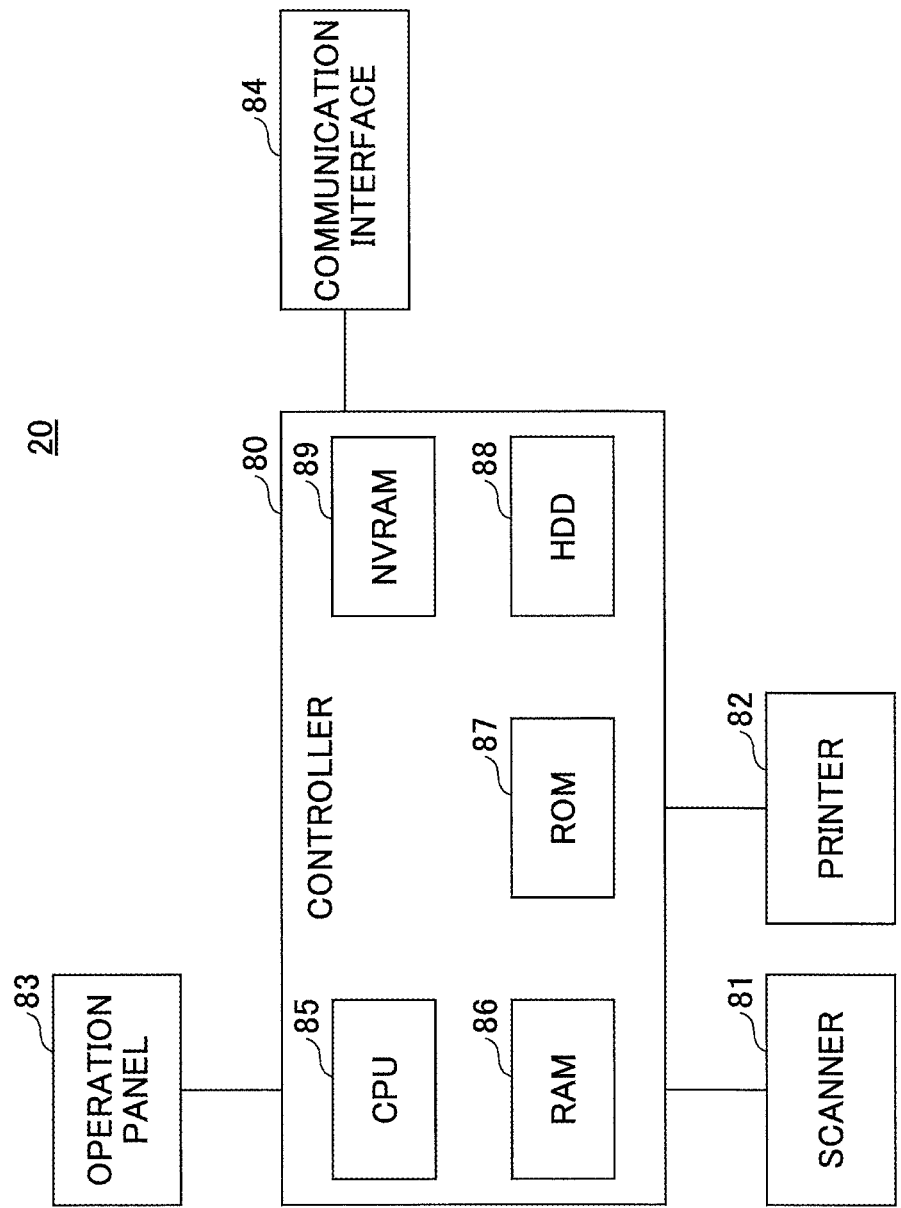
FIG. 6 shows one example of a hardware configuration of the image forming apparatus according to the first embodiment.

FIG. 6 shows one example of a hardware configuration of the image forming apparatus 20 according to the first embodiment. As shown in FIG. 6, the image forming apparatus 20 is configured to include a controller 80, the scanner 81, the printer 82, an operation panel 83 and a communication interface 84.

The controller 80 is configured to include a CPU 85, a RAM 86, a ROM 87, a Hard Disk Drive (HDD) 88 and a NonVolatile RAM (NVRAM) 89.

The CPU 85 realizes various functions by executing a program(s) loaded in the RAM 86. the RAM 86 is used as a storage area for loading the program(s), a work area for the loaded program(s), and so forth. In the ROM 87, various programs, data to be used by the programs, and so forth, are stored.

In the HDD 88, a program(s) and various data to be used by the program(s) are stored. In the NVRAM 89, various setting information and so forth are stored.

The scanner 81 is hardware (image reading part) for reading image data from an original document. The printer 82 is hardware (printing part) for printing print data onto printing paper. The operation panel 83 is hardware that includes input parts such as buttons for receiving a user's input, a display part such as a liquid crystal panel, and so forth.

The communication interface 84 is hardware for connecting to a network (wired or wireless) such as a Local Area Network (LAN).

The respective functions of the control part 26 shown in FIG. 3 are controlled by the controller 80 shown in FIG. 6.

<Hardware Configuration of Server 30>

Figure 7:
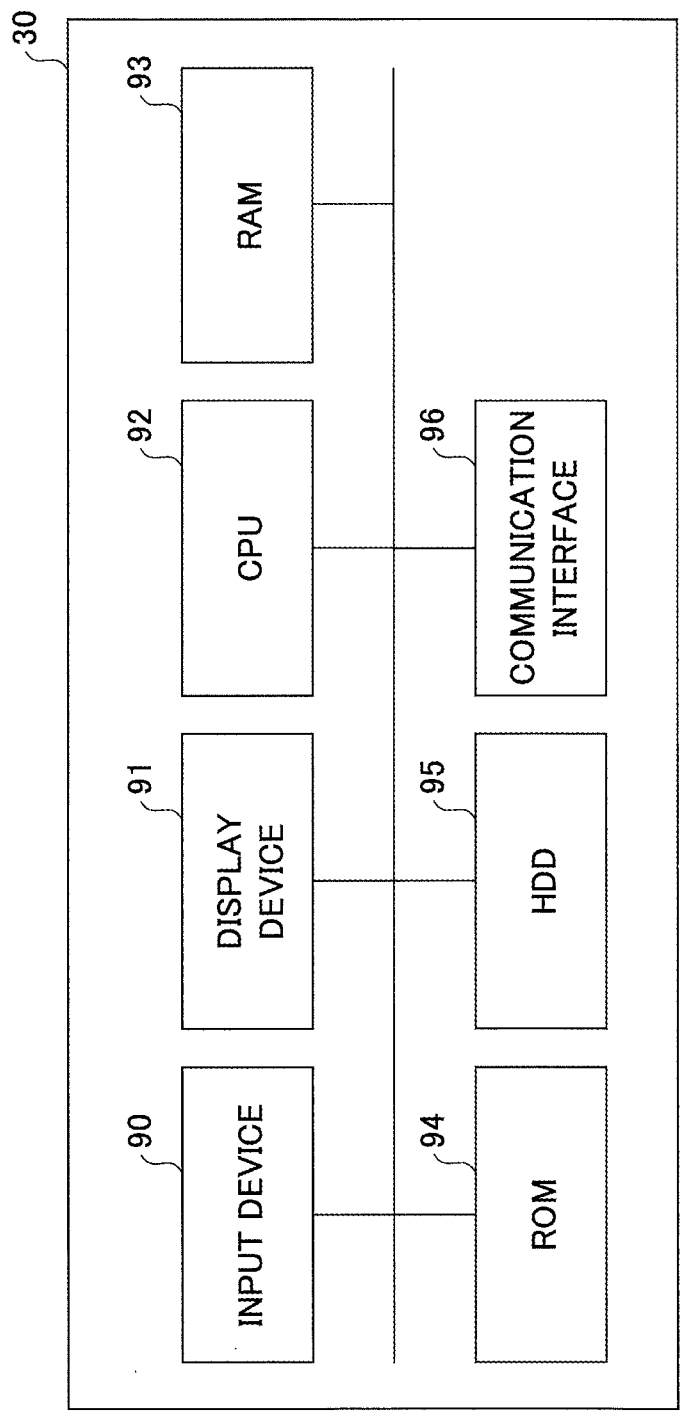
FIG. 7 shows one example of a hardware configuration of the server according to the first embodiment.

FIG. 7 shows one example of a hardware configuration of the server 30 according to the first embodiment. As shown in FIG. 7, the server 30 is configured to include an input device 90, a display device 91, a CPU 92, a RAM 93, a ROM 94, a HDD 95 and a communication interface 96.

The input device 90 includes, for example, a keyboard, a pointing device such as a mouse, and is used for inputting various operation signals. The display device 91 includes a display or the like, and displays various processing results.

The CPU 92 reads a program(s) and/or data for realizing the above-described parts and so forth from a storage device (for example, the HDD 88, the ROM 87, or the like) to the RAM 93, carries out respective processes, and/or realizes control of the entirety of the server 30 and/or functions that the server 30 has.

The RAM 93 is a volatile semiconductor memory (storage device) for temporarily storing a program(s) and/or data for realizing respective parts.

The ROM 94 is a nonvolatile semiconductor memory (storage device) that can hold the internal data even after the power has been turned off. In the ROM 94, a program(s) and data such as a Basic Input/Output System (BIOS) to be executed at a time of starting up, system settings, network settings, and/or the like are stored.

The HDD 95 is a nonvolatile storage device that stores programs and data. The programs and data stored therein include a system (for example, an Operating System (OS) that is basic software such as "Windows (registered trademark)", "UNIX (registered trademark)" or the like) for controlling the entirety of the server 30, applications for providing various functions under the control of the system, and/or the like.

Further, in the HDD 95, a program(s) for realizing the above-described respective parts and/or data such as the guidance information are stored. The HDD 95 manages the stored program(s) and/or data using a predetermined file system and/or DataBase (DB).

The communication interface 96 is an interface for connecting to a wired or wireless network. Thereby, the server 30 is capable of carrying out data communication with another apparatus(es) via the communication interface 96.

The server 30 is capable of providing various processes through the above-described configuration.

<Guidance Information Display Sequence>

Figure 8:
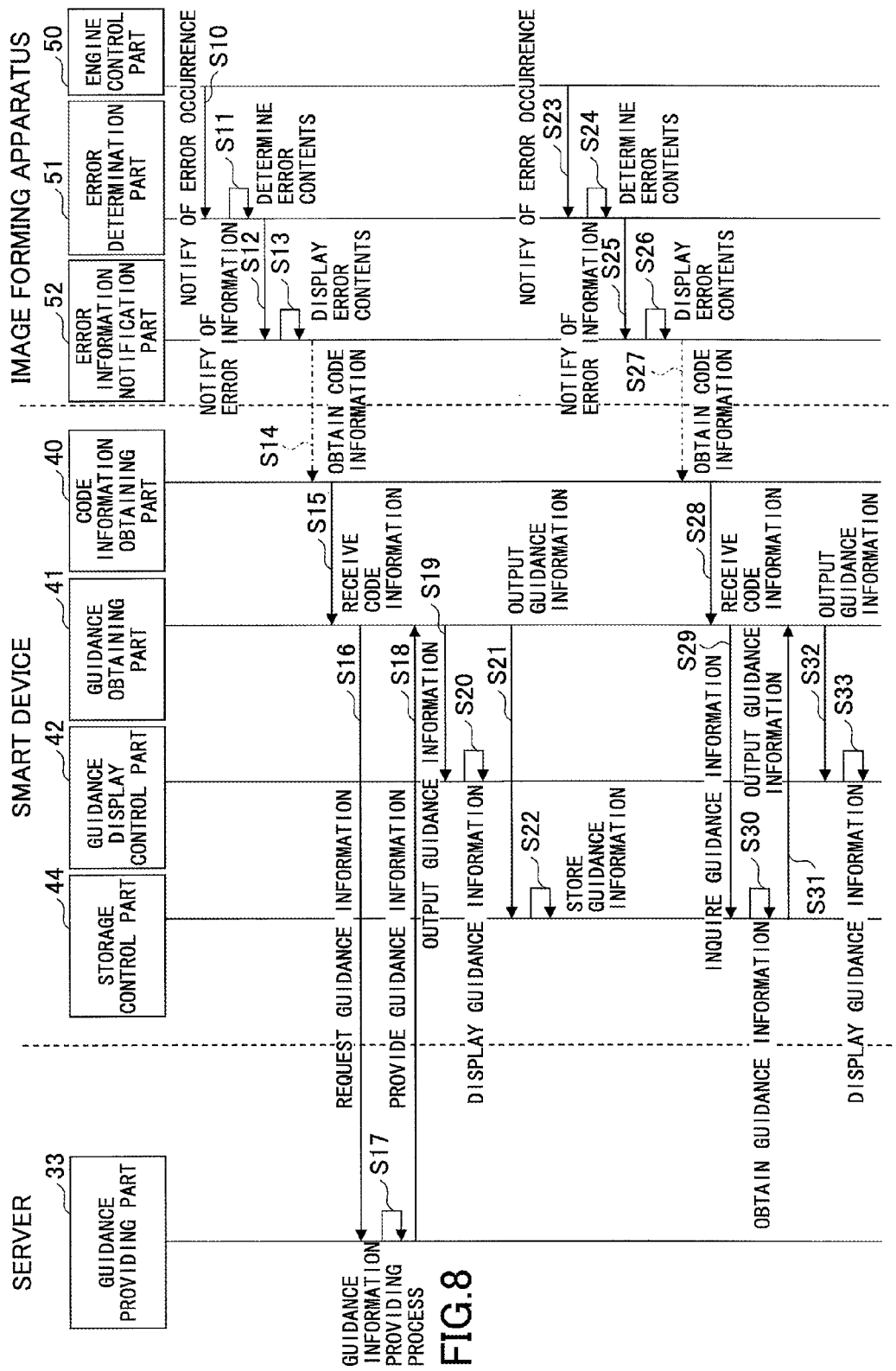
FIG. 8 shows one example of a guidance information display sequence according to the first embodiment.

FIG. 8 shows one example of a guidance information display sequence according to the first embodiment. It is to be noted that FIG. 8 shows a sequence to be carried out, for example, after the image forming apparatus 20 has received a print request from the smart device 10, and has detected an occurrence of an error (problem) concerning execution of the print request.

As shown in FIG. 8, when the engine control part 50 has detected an error in the image forming apparatus 20, the engine control part 50 notifies the error determination part 51 of the occurrence of the error (step S10). Then, the error determination part 51 determines the error contents (step S11), and then, notifies the error information notification part 52 of the error information (step S12).

The error information notification part 52 of the image forming apparatus 20 converts the error information into the predetermined code information such as a QR code or the like, and displays the predetermined code information on the screen of the operation part 23 (step S13).

When the QR code or the like (predetermined code information) has been thus displayed on the screen of the operation part 23 of the image forming apparatus 20, the image-taking part 11 of the smart device 10 is used to read the displayed QR code or the like, and the code information obtaining part 40 of the smart device 10 obtains the corresponding code information (step S14).

Then, the guidance obtaining part 41 of the smart device 10 obtains the code information from the code information obtaining part 40 (step S15). Then, the guidance obtaining part 41 requests the corresponding guidance information from the server 30 (step S16) based on, for example, the error code or the like included in the code information. At this time, the guidance obtaining part 41 transmits, to the server 30, the information indicating the display capability of the display part 13 (display device 72) together with the error code.

In response to the request for the guidance information (guidance information obtaining request) (step S16) thus made by the smart device 10, the guidance providing part 33 of the server 30 carries out a process for providing the guidance information (step S17), and provides the guidance information to the smart device 10 (step S18). It is to be noted that the process for providing the guidance information (guidance information providing process) carried out by the guidance information providing part 33 will be described later.

When the guidance obtaining part 41 of the smart device 10 has thus received the guidance information from the server 30, the guidance obtaining part 41 outputs the obtained guidance information to the guidance display control part 42 of the smart device 10 (step S19), and the guidance display control part 42 displays the guidance information on the display part 13 (display device 72) (step S20). Further, the guidance obtaining part 41 of the smart device 10 outputs the obtained guidance information to the storage control part 44 (step S21) and the storage control part 44 stores the guidance information in the storage part 14 (step S22).

Further, when the smart device 10 has sent another print request to the image forming apparatus 20 and an error has been detected in the image forming apparatus 20, steps S23 to S27 same as steps S10 to S14 are carried out in the image forming apparatus 20.

Then, when the guidance obtaining part 41 of the smart device 10 has received the code information from the code information obtaining part 40 (step S28), the guidance obtaining part 41 inquires of the storage control part 44 whether the guidance information corresponding to the error code included in the received code information exists in the storage part 14 (step S29). Then, when the storage control part 44 has determined that the guidance information corresponding to the error code exists in the storage part 14, the storage control part 44 obtains the corresponding guidance information from the storage part 14 (step S30), and outputs the obtained guidance information to the guidance obtaining part 41 (step S31).

Then, when the guidance obtaining part 41 of the smart device 10 has thus obtained the guidance information (step S31), the guidance obtaining part 41 outputs the obtained guidance information to the guidance display control part 42 (step S32), and the guidance display control part 42 displays the guidance information on the display part 13 (display device 72) (step S33), in the same way as the above-described process.

<Guidance Information Providing Process>

Figure 9:
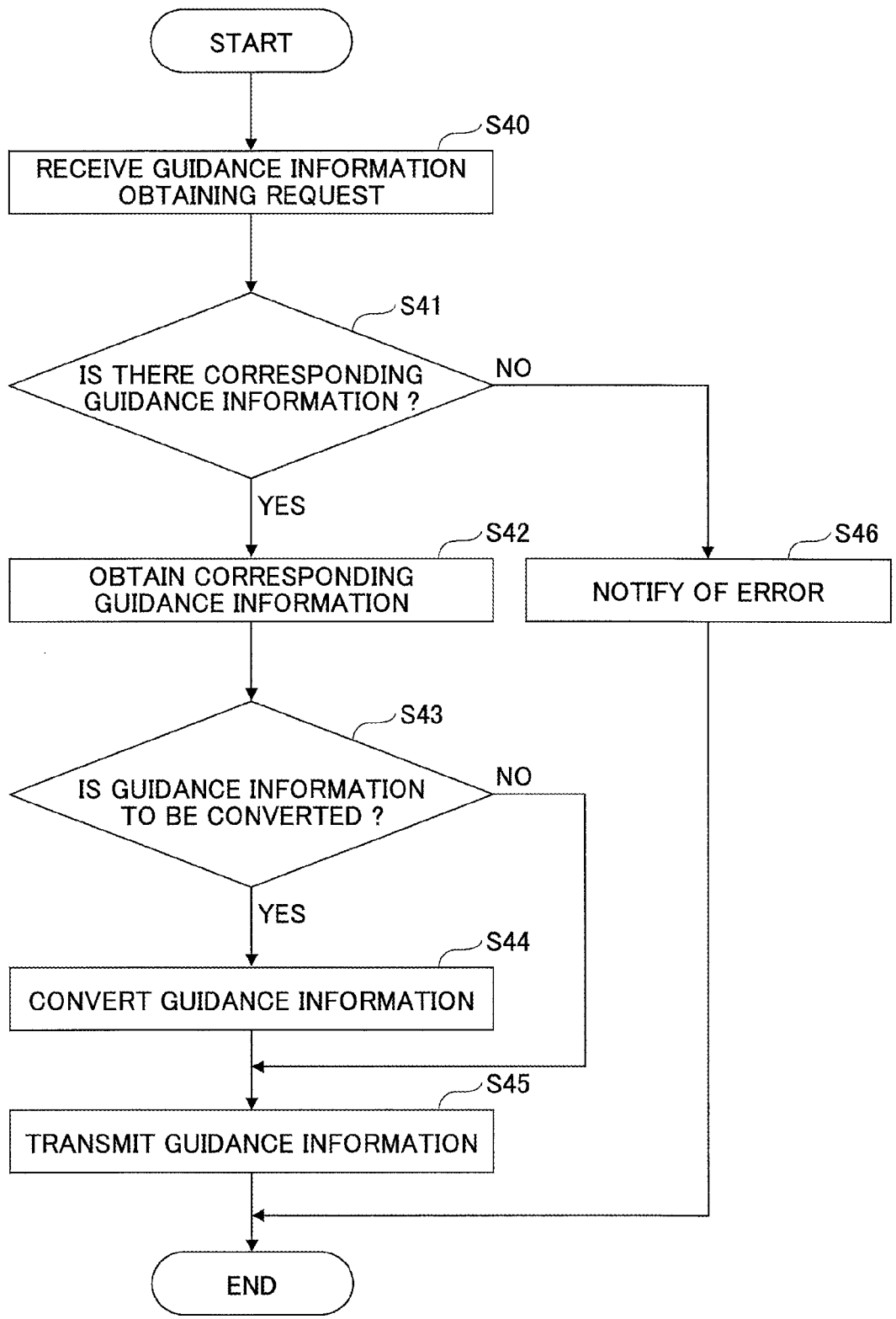
FIG. 9 is a flowchart showing a flow of a guidance information providing process according to the first embodiment.

FIG. 9 is a flowchart showing the guidance information providing process according to the first embodiment. As shown in FIG. 9, when the guidance providing part 33 of the server 30 has received the guidance information obtaining request from the smart device 10 (step S40), the guidance obtaining part 60 determines whether the guidance information corresponding to the guidance information obtaining request exists in the storage part 32 (step S41).

When having determined that the corresponding guidance information exists in the storage part 32 (step S41 YES), the guidance obtaining part 60 of the server 30 obtains the corresponding guidance information from the storage part 32 (step S42).

Then, based on the information indicating the display capability of the display part 13 (display device 72) of the smart device 10 included in the guidance information obtaining request of the smart device 10, the guidance conversion part 61 of the server 30 determines whether it is necessary to convert the guidance information obtained in step S42 (step S43).

When the guidance conversion part 61 of the server 30 has determined that it is necessary to convert the guidance information (step S43 YES), the guidance conversion part 61 converts the guidance information based on the information indicating the display capability of the display part 13 (display device 72) of the smart device 10 (step S44). For example, the guidance conversion part 61 converts the guidance information to one corresponding to the screen size, the resolution and/or the like of the screen page that the display part 13 (display device 72) of the smart device 10 is capable of displaying, when having determined that the guidance information does not correspond to the screen size, the resolution and/or the like.

When the guidance conversion part 61 has thus converted the guidance information, the guidance obtaining part 60 of the server 30 transmits the guidance information to the smart device 10 (step S45), and the process is finished. It is to be noted that, when the guidance conversion part 61 has determined that it is not necessary to convert the guidance information (step S43 NO), the guidance obtaining part 60 of the server 30 transmits the guidance information to the smart device 10 (step S45) without converting it, and the process is finished.

When having determined that no corresponding guidance information exists in the storage part 32 (step S41 NO), the guidance obtaining part 60 of the server 30 notifies the smart device 10 that there is no corresponding guidance information (error) (step S46), and the process is finished.

<In Case of Screen Settings of Smart Device 10 Having been Changed>

Figure 10:
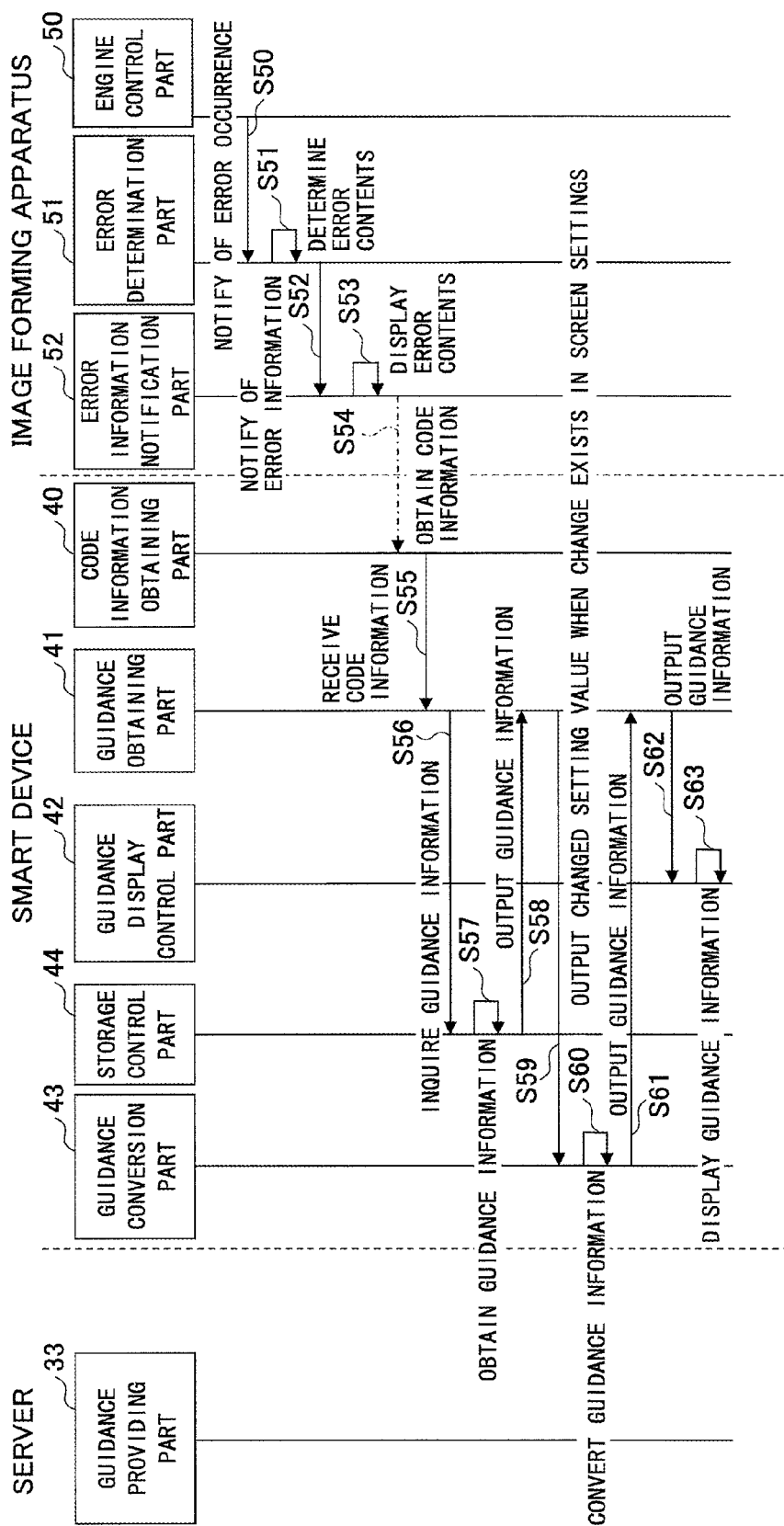
FIG. 10 shows one example of a sequence for a case where screen settings have been changed.

FIG. 10 shows one example of a sequence for a case where the screen settings in the smart device 10 have been changed. It is to be noted that, FIG. 10 shows, for example, a sequence for a case where the screen settings that have been set to the smart device 10 have been changed after the processes of steps S10 to S22 of the sequence shown in FIG. 8. Since steps S50 to S58 are the same as steps S23 to S31 of FIG. 8, duplicate descriptions will be omitted.

When having obtained the guidance information from the storage part 14 in step S58, the guidance obtaining part 41 of the smart device 10 obtains the information indicating the display capability of the display part 13 (display device 72) from the storage part 14, and determines whether a change has been made in the screen settings, for example. When, for example, having determined that a change has been made in the screen settings, the guidance obtaining part 41 outputs the changed setting value of the screen settings to the guidance conversion part 43 together with the guidance information (step S59).

Then, the guidance conversion part 43 of the smart device 10 converts the guidance information into one corresponding to the setting value (step S60), and outputs the converted guidance information to the guidance obtaining part 41 (step S61). Then, the guidance obtaining part 41 of the smart device 10 outputs the converted guidance information to the guidance display control part 42 (step S62).

Then, the guidance display control part 42 of the smart device 10 displays the guidance information on the display part 13 (display device 72), in the same way as the above-described process (step S63).

<QR Code Information>

Figures 11A, 11B:
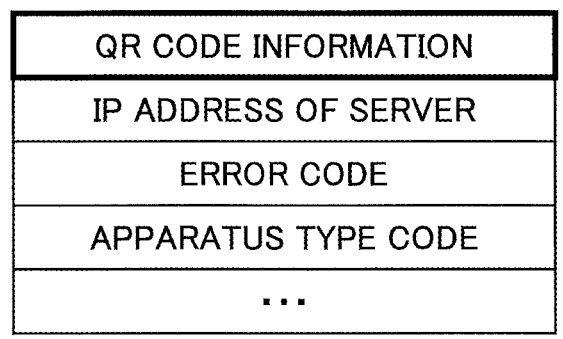
FIGS. 11A and 11B show one example of QR code information according to the first embodiment.

FIGS. 11A and 11B show one example of the QR code information according to the first embodiment. The example of FIG. 11A shows the above-mentioned QR code information to be displayed on the screen of the image forming apparatus 20.

FIG. 11A shows the item contents included in the QR code, and FIG. 11B shows respective examples of the error code and the apparatus type code.

As shown in FIG. 11A, the QR code information includes, for example, as respective items, "IP Address of Server", "Error Code" and "Apparatus Type Code". For example, the item "IP Address of Server" indicates inquiry destination information for reaching the server 30 that stores the guidance information to be used for removing an error. The item "Error Code" indicates the contents of the error that has occurred in the image forming apparatus 20. The item "Apparatus Type Code" indicates the apparatus type of the image forming apparatus 20.

As shown in FIG. 11B, specific examples of "Error Code" include, for example, "JAM001", "JAM002", and so forth, and specific examples of "Apparatus Type Code" include, for example, "AXYZ-001", "AXYZ-002b", and so forth.

By obtaining the QR code information as shown in FIG. 11A described above, the smart device 10 is capable of requesting the guidance information from the server 30 that stores the guidance information to be used for dealing with the error, and obtaining the guidance information corresponding to the error code and the apparatus type (code).

Example of Displaying QR Code

FIG. 12 shows one example of the QR code displayed on the screen of the operation part 23 of the image forming apparatus 20. As shown in FIG. 12, a QR code display area 190, for example, is provided in the operation screen of the operation part 23 of the image forming apparatus 20.

When an error has occurred during processing carried out in response to a print request or the like sent from the smart device 10, the image forming apparatus 20 displays a message such as "Error has occurred! Please read QR code and deal with the error.", and displays a QR code 191 that includes the information shown in FIG. 11A, as shown in FIG. 12.

The smart device 10 is used to read the QR code 191, and obtains the guidance information to be used for dealing with the error from the server 30 as described above. It is to be noted that the specific position of the QR code display area 190 is not limited to the example shown in FIG. 12. Further, a plurality of the QR codes may be displayed in the operation screen of the operation part 23. In a case where a plurality of the QR codes are thus displayed, respective sets of information are read from the plurality of the QR codes by the smart device 10.

Example of Displaying Guidance Information

Figure 13C:
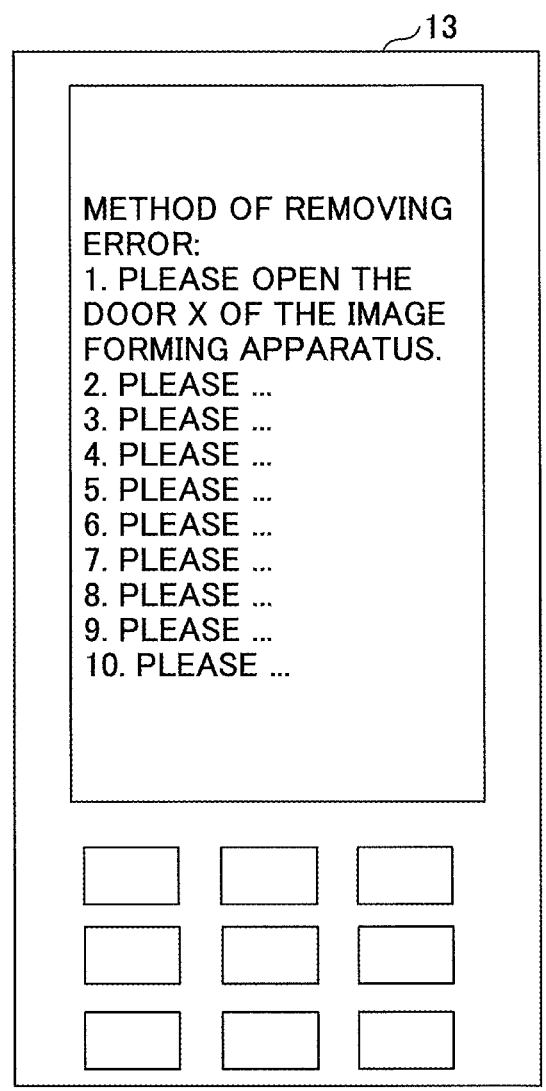

FIGS. 13A to 13C show examples of displaying the guidance information displayed on the screens of the smart devices 10. It is to be noted that the examples of FIGS. 13A to 13C show the contents of a detailed description of an error removal procedure (manual) as one example of the guidance information.

FIG. 13A shows an example of the guidance information corresponding to the resolution of the screen of the display part 13 (display device 72) being displayed. FIG. 13B shows an example of the guidance information not corresponding to the resolution of the screen of the display part 13 (display device 72) being displayed. FIG. 13C shows an example of the guidance information not corresponding to the screen size of the display part (display device 72) being displayed.

As shown in FIG. 13B, in the case of, for example, the guidance information not corresponding to the resolution of the screen of the display part (display device 72) being displayed, the characters are displayed, for example, as being so large that the characters are not easily read. Therefore, by converting the guidance information appropriately so that the guidance information, for example, corresponding to the resolution of the screen of the display part 13 (display device 72) is displayed as shown in FIG. 13A, the characters displayed by the display part 13 (display device 72) of the smart device 10 are able to be easily read.

Further, as shown in FIG. 13C, in the case of, for example, the guidance information not corresponding to the size of the screen of the display part 13 (display device 72) being displayed, the characters are displayed, for example, as being so small that the characters are not easily read. In such a case, the guidance information is to be converted appropriately so that the guidance information of, for example, the number of characters being reduced and the character size being increased is displayed, and thus, the characters displayed by the display part 13 (display device 72) of the smart device 10 are able to be easily read.

Figure 14A:
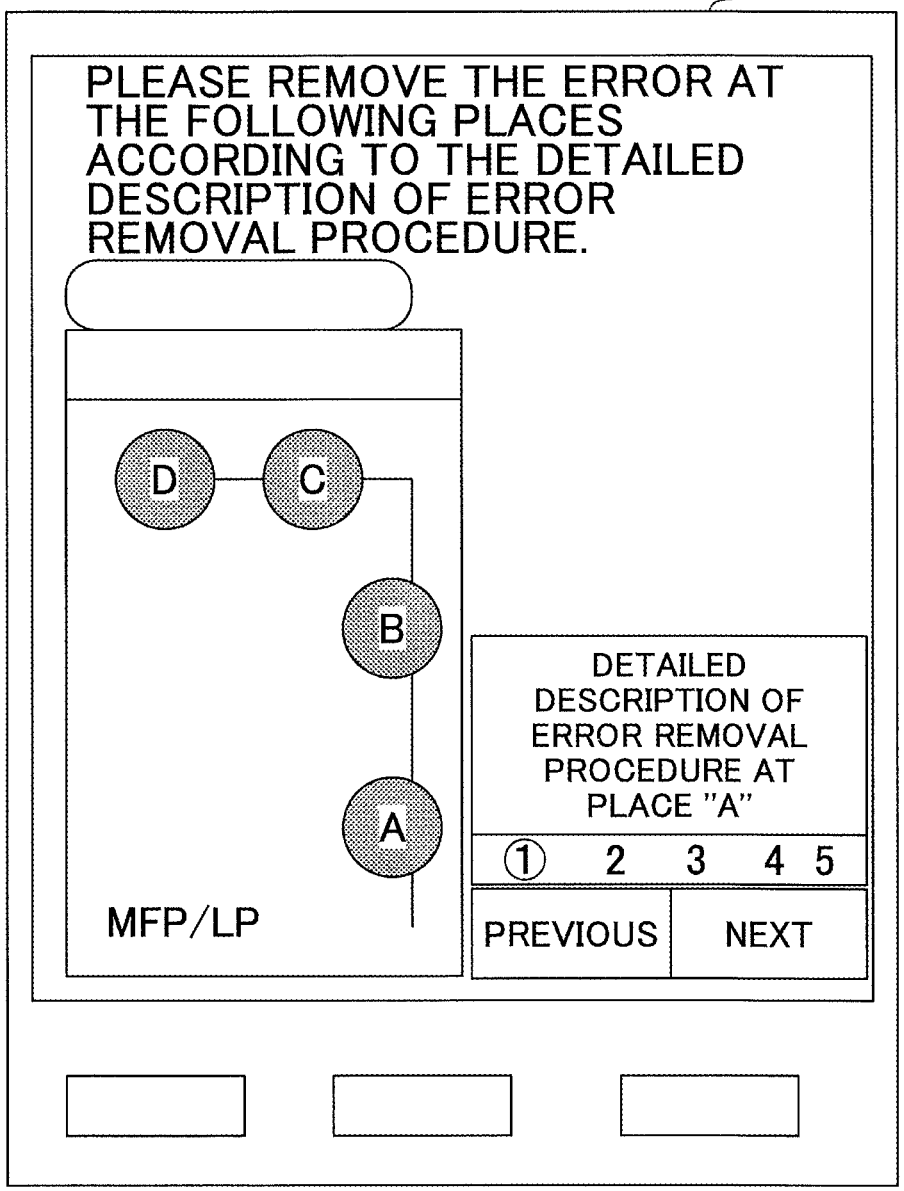
FIGS. 14A and 14B show specific examples of displaying the guidance information on screens of smart devices.
Figure 14B:
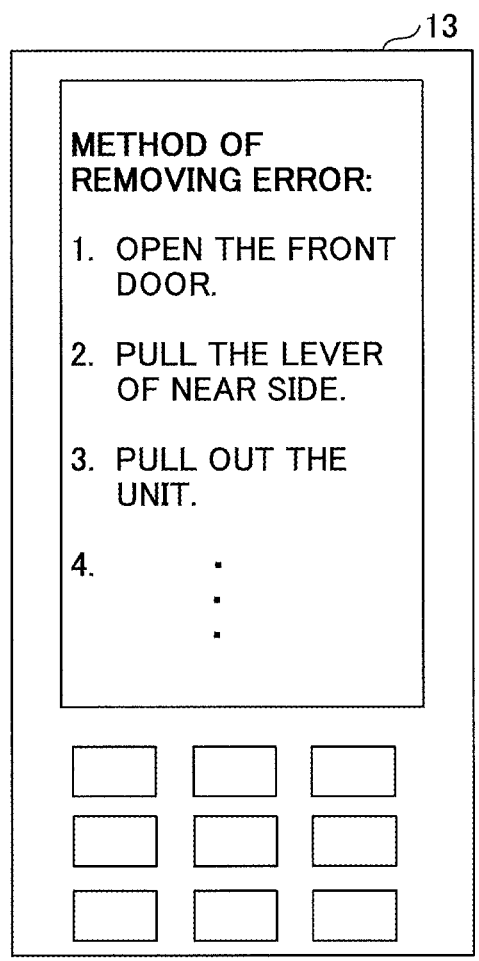

FIGS. 14A and 14B show specific examples of the guidance information displayed on the screen of the smart device 10. FIG. 14A shows an example of the guidance information displayed on the screen, having a larger size, of the display part 13 (display device 72) of the smart device 10. FIG. 14B shows an example of the guidance information displayed on the screen, having a smaller size, of the display part 13 (display device 72) of the smart device 10.

As shown in FIG. 14A, in a case where the screen size of the display part 13 (display device 72) of the smart device 10 is larger, it is possible to display the guidance information in a manner of, in addition to displaying characters, using drawings and/or animations. In contrast thereto, as shown in FIG. 14B, in a case where the screen size of the display part 13 (display device 72) of the smart device 10 is smaller, it is possible to display the guidance information using characters having a size corresponding to the screen size without using drawings and/or animations.

As described above using FIGS. 13A to 13B and FIGS. 14A and 14B, it is possible to display the guidance information on the screen of the display part 13 (display device 72) of the smart device 10 in a manner suitable for the screen of the display part 13 (display device 72), according to the first embodiment. This is because, according to the first embodiment, when the smart device 10 is used to read the QR code from the image forming apparatus 20 and inquire of the server 30 the guidance information, the smart device 10 includes the information indicating the display capability of the display part (display device 72) of the smart device 10 in the inquiry to be thus sent to the server 30. Thereby, it is possible that the smart device 10 obtains and downloads from the server 30 the guidance information suitable for the screen of the display part 13 (display device 72) of the smart device 10 itself.

Thus, according to the first embodiment, it is possible to realize a display suitable for each display apparatus. It is to be noted that although, according to the first embodiment, the guidance information corresponding to the error information of the image forming apparatus 20 is obtained, the information to be thus obtained is not limited to this example. For example, it is also possible to obtain, instead of the guidance information corresponding to an error (problem), information (an operation manual or the like) indicating a manner of operating an electronic apparatus corresponding to an operation of the electronic apparatus that may be a projection apparatus (projector).

According to the display apparatus, the method of controlling operations of the same, and the network system of the first embodiment, it is possible to display information in a manner suitable for each display apparatus.

Although the display apparatus, the method of controlling operations of the same, and the network system have been described by the embodiment, the present invention is not limited to the specifically disclosed embodiment, and variations and modifications may be made without departing from the scope of the present invention.

The present patent application is based on and claims the benefit of priority of Japanese Priority Application No. 2012-172309 filed on Aug. 2, 2012, the entire contents of which are hereby incorporated herein by reference.

What is claimed is:

1. A display apparatus comprising:
    a display device;
    a first obtaining part that obtains, from an electronic apparatus, first information indicating an error occurring in the electronic apparatus;
    a second obtaining part that transmits, to an external information processing apparatus, the first information obtained by the first obtaining part and second information indicating a display capability of the display device, and obtains third information indicating a manner of dealing with the error occurring in the electronic apparatus which has been transmitted by the external information processing apparatus based on the first information and the second information; and
    a display control part that displays, on the display device, the third information obtained by the second obtaining part,
    wherein the second obtaining part transmits, as the second information, a size of a screen page that the display device is capable of displaying or resolution information of the display device, and obtains the third information from the external information processing apparatus based on the first information and the size of the screen page or the resolution information of the display device which have been transmitted by the second obtaining part.

2. The display apparatus as claimed in claim 1, wherein the first obtaining part obtains inquiry destination information for inquiring the third information, and
    based on the inquiry destination information that the first obtaining part has obtained, the second obtaining part transmits, to the external information processing apparatus, the first information obtained by the first obtaining part and the second information, and obtains, from the external information processing apparatus, the third information.

3. The display apparatus as claimed in claim 1, wherein the second obtaining part obtains the third information that has been transmitted by the external information processing apparatus based on the second information.

4. The display apparatus as claimed in claim 1, further comprising:
    a storage part that stores therein the third information that has been obtained by the second obtaining part, wherein the second obtaining part determines whether the third information corresponding to the first information obtained by the first obtaining part is stored in the storage part, and obtains the third information when having determined that the third information corresponding to the first information obtained by the first obtaining part is stored in the storage part.

5. The display apparatus as claimed in claim 1, further comprising
    a reading part that reads information displayed on the electronic apparatus, wherein
    the first obtaining part obtains the first information from among the information that the reading part has read.

6. A method of controlling operations of a display apparatus that has a display device, the method comprising:
    obtaining, by a processor, first information indicating an error occurring in an electronic apparatus from the electronic apparatus;
    transmitting, by the processor, to an external information processing apparatus, the obtained first information and second information indicating a display capability of the display device;
    obtaining, by the processor, third information indicating a manner of dealing with the error occurring in the electronic apparatus which has been transmitted by the external information processing apparatus based on the transmitted first information and the transmitted second information;
    transmitting, by the processor, as the second information, a size of a screen page that the display device is capable of displaying or resolution information of the display device, and obtains the third information from the external information processing apparatus based on the first information and the size of the screen page or the resolution information of the display device which have been transmitted by the second obtaining part; and
    displaying, by the processor, the obtained third information on the display device.

7. A network system comprising:
    an application installed in a display apparatus that has a display device; and
    an information processing apparatus, wherein
    the application, when executed by one or more processors, causes the display apparatus to function as
        a first obtaining part that obtains first information indicating an error occurring in an electronic apparatus from the electronic apparatus,
        a second obtaining part that transmits, to the information processing apparatus, the first information obtained by the first obtaining part and second information indicating a display capability of the display device, and obtains third information indicating a manner of dealing with the error occurring in the electronic apparatus which has been transmitted by the information processing apparatus based on the first information and the second information, and
        a display control part that displays, on the display device, the third information obtained by the second obtaining part, and
    the information processing apparatus including
        a storage part that stores the third information,
        a third obtaining part that obtains the third information stored in the storage part based on the first information and the second information which have been transmitted by the display apparatus, and
        a transmission part that transmits, to the display apparatus, the third information which has been obtained by the third obtaining part.

8. The network system as claimed in claim 7, wherein
    the third obtaining part converts the third information, obtained from the storage part, based on the second information transmitted by the display apparatus, and
    the transmission part transmits the third information converted by the third obtaining part to the display apparatus.

* * * * *